(12) United States Patent
Zhang (10) Patent No.: US 12,416,399 B2
(45) Date of Patent: Sep. 16, 2025

(54) PHOTOLUMINESCENCE KEYBOARD GLYPH LIGHTING

(71) Applicant: Apple Inc., Cupertino, CA (US)

(72) Inventor: Chang Zhang, San Jose, CA (US)

(73) Assignee: APPLE INC., Cupertino, CA (US)

( * ) Notice: Subject to any disclaimer, the term of this patent is extended or adjusted under 35 U.S.C. 154(b) by 179 days.

(21) Appl. No.: 17/810,458

(22) Filed: Jul. 1, 2022

(65) Prior Publication Data

US 2024/0003528 A1   Jan. 4, 2024

(51) Int. Cl.
*F21V 23/04*  (2006.01)
*F21K 2/00*   (2006.01)

(52) U.S. Cl.
CPC .......... *F21V 23/0464* (2013.01); *F21K 2/005* (2013.01)

(58) Field of Classification Search
CPC .............................. F21V 23/0464; F21K 2/005
USPC ....................................................... 362/23.03
See application file for complete search history.

(56) References Cited

U.S. PATENT DOCUMENTS

| 8,432,485 | B1* | 4/2013 | Martinez | H04N 23/57 |
| | | | | 348/207.1 |
| 10,444,856 | B1* | 10/2019 | Wang | H01H 13/83 |
| 2015/0138750 | A1* | 5/2015 | Yen | G02B 6/0055 |
| | | | | 362/23.03 |
| 2017/0357439 | A1* | 12/2017 | Lemay | H04M 1/67 |
| 2019/0288163 | A1* | 9/2019 | Choi | H01L 27/15 |

* cited by examiner

*Primary Examiner* — Tracie Y Green
*Assistant Examiner* — Hana S Featherly
(74) *Attorney, Agent, or Firm* — Dorsey & Whitney LLP (57) ABSTRACT

A keycap assembly can include a keycap that includes a chargeable light emissive material. The keycap assembly can include a light sensor configured to sense light emitted by or incident to the chargeable light emissive material. The keycap assembly can further include a microcontroller. In certain implementations, the microcontroller includes a processor and a memory device storing instructions that, when executed by the processor, cause the microcontroller to: receive an electrical signal from the light sensor; and determine a property of the chargeable light emissive material based on the electrical signal, where the property includes at least one of a charge level or an illumination intensity.

22 Claims, 7 Drawing Sheets

PHOTOLUMINESCENCE KEYBOARD GLYPH LIGHTING

FIELD

The described embodiments relate generally to keyboards and key mechanisms for electronic devices. More particularly, the present embodiments relate to photoluminescent material on or within keyboards and key mechanisms for electronic devices.

BACKGROUND

Keyboards for computing devices have many purposes and are used in a wide range of places and times. A keyboard is one of the largest, most prominent, and most used parts of a computer, and as such, plays a crucial role in a user's experience with the device. Keyboards strongly influence the appearance and aesthetic of the computer, the usability and approachability of the device, the user's perception of quality, the tactile and audible feedback provided to the user, and more.

Keyboard keys often include legends or glyphs used to identify the functions of each key. Also, to improve ease of use of a keyboard in low light conditions, many keyboards provide backlighting that illuminates the keys or glyphs. Such traditional keyboard backlighting methods typically include an active light source, such as light emitting diodes and an optical system that brings light to the top of the key for glyph visibility. These types of traditional backlighting require an active electrical subsystem to drive the light source, thereby consuming power in systems that are often power constrained (e.g., battery powered laptops or battery powered standalone wireless keyboards). Therefore, there is a constant need for improvements to the usability, manufacture, and effectiveness of keys and other buttons for electronic devices.

SUMMARY

An aspect of the present disclosure relates to a keycap assembly. In some embodiments, the keycap assembly includes a keycap that includes a chargeable light emissive material. The keycap assembly can include a light sensor configured to sense light emitted by or incident to the chargeable light emissive material. The keycap assembly can further include a microcontroller. In certain embodiments, the microcontroller includes a processor and a memory device storing instructions that, when executed by the processor, cause the microcontroller to: receive an electrical signal from the light sensor; and determine a property of the chargeable light emissive material based on the electrical signal, where the property includes at least one of a charge level or an illumination intensity.

In one or more embodiments, the light sensor is disposed on or within a keyboard housing adjacent to the keycap; and incident light onto the chargeable light emissive material from a light source is detectable by the light sensor. In some embodiments, the incident light corresponds to an ambient light source or an artificial light source positioned on a computing device. Further, in some embodiments, the property is determined based on a duration of time that the light sensor detects light from a light source.

Additionally, in some embodiments, the electrical signal includes an illuminance measurement identified by the light sensor. In one or more embodiments, the illumination intensity of the chargeable light emissive material corresponds to the illuminance measurement. In certain embodiments, the keycap includes the chargeable light emissive material in a glyph layer positioned over a second layer. In particular embodiments, the keycap includes a layer of the chargeable light emissive material with a glyph portion formed in the layer of the chargeable light emissive material.

Another aspect of the present disclosure relates to a computing device. In some embodiments, the computing device includes a display, a keyboard housing, and a set of key mechanisms disposed within the keyboard housing, where the set of key mechanisms include photoluminescent keycaps. In certain embodiments, the computing device further includes a light sensor has a field of view including a view of the photoluminescent keycaps. Additionally, in one or more embodiments, the computing device includes a microcontroller that, in response to light sensor data from the light sensor, causes the display to provide an illumination output to the photoluminescent keycaps.

In certain implementations, ambient light or the illumination output illuminating the set of key mechanisms is detectable by the light sensor. In one or more embodiments, the illumination output of the display includes a wavelength invisible to an unaided human eye.

In some embodiments, the light sensor is configured to generate the light sensor data indicative of a charge level for the photoluminescent keycaps. Further, in some embodiments, the illumination output of the display includes: a first illumination output associated with a first illuminance when the charge level of the photoluminescent keycaps satisfies a charge threshold; and a second illumination output associated with a second illuminance that differs from the first illuminance when the charge level of the photoluminescent keycaps falls below the charge threshold. In particular embodiments, the microcontroller, in response to the light sensor data from the light sensor, transitions the display from providing the first illumination output to providing the second illumination output.

Yet another aspect of the present disclosure relates to a keyboard assembly. In one or more embodiments, the keyboard assembly includes a keyboard housing, a set of key mechanisms disposed within the keyboard housing, and a photoluminescent material associated with at least one of the set of key mechanisms or the keyboard housing. In some embodiments, the keyboard assembly includes a light sensor disposed on or within the keyboard housing, where light detected by the light sensor is indicative of incident light onto the photoluminescent material. Further, in some embodiments, the keyboard assembly includes a microcontroller that, in response to the light detected by the light sensor, transmits a digital communication to an electronic device.

In one or more embodiments, the light sensor is positioned on or within the keyboard at a location where the light detected by the light sensor comprises an approximately equivalent illumination intensity as the incident light onto the photoluminescent material. The digital communication can include a current charge level of the photoluminescent material. The photoluminescent material can be positioned on a key web of the keyboard housing between the set of key mechanisms. Additionally, in some embodiments, the keyboard assembly further includes a substrate, where light passes through or emits from a surface of the substrate and impinges upon the light sensor. In one or more embodiments, the electronic device includes a light source and the digital communication includes a signal to adjust light output from the light source based on the light detected by the light sensor.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates to a chargeable light emissive material on or within a keyboard assembly. Rather than solely using an active power source, the chargeable light emissive material can be conveniently charged via ambient light or via an artificial light source. For instance, the chargeable light emissive material can use natural sunlight, ambient/room lighting, or a computing device display to charge the chargeable light emissive material. In turn, the chargeable light emissive material can reduce an amount of power consumption (e.g., from an onboard, active power source) used by the computing device—leading to extended battery life via more efficient power consumption.

In some embodiments, the chargeable light emissive material includes one or more photoluminescent portions of a keycap. For example, a keycap can include a photoluminescent keycap body (e.g., with a dark, non-photoluminescent glyph). As another example, the keycap can include one or more photoluminescent layers. For instance, the keycap can include a photoluminescent coating over a keycap body (e.g., with a dark glyph etched out of the photoluminescent coating). In another instance, the keycap can include a photoluminescent glyph layer applied onto the keycap body (e.g., a non-photoluminescent keycap body). In some embodiments, a keycap includes a photoluminescent border or other non-glyph indicator extending along one or more edges of the keycap.

Additionally or alternatively, in some embodiments, the chargeable light emissive material includes photoluminescent material on portions of a keyboard assembly other than a keycap. For example, a keyboard housing can include photoluminescent portions. To illustrate, a keyboard web (e.g., of the keyboard housing) extending in between and/or around key mechanisms can comprise a photoluminescent material, coating, or inset portion. A perimeter of the keyboard housing can also be photoluminescent. Additionally or alternatively, a trackpad or some portion thereof (e.g., the periphery) can be photoluminescent. Further, structures (e.g., support structures, base layers, or membranes) underneath the keycaps can be photoluminescent. For example, a substrate underneath the key mechanisms can be photoluminescent for emitting (or guiding) light through keycaps, around keycaps, or up to certain layers of a keycap.

In one or more embodiments, the chargeable light emissive material can be monitored or tracked. For example, various properties of the chargeable light emissive material can be monitored during periods of use or inactivity. To illustrate, a computing device can include a sensor with a field of view configured to capture light emitted by the chargeable light emissive material (e.g., for determining an illumination intensity or charge level). As another example, a keyboard assembly can use a light sensor that detects light to estimate incident light at the chargeable light emissive material (e.g., for similarly determining an estimate of the illumination intensity or charge level of the light emissive material).

In turn, a microcontroller can generate and transmit a response signal based on the illumination intensity or charge level. For example, microcontroller can cause the display to alter an illumination output (e.g., increase an illuminance) of the display for the purpose of charging the chargeable light emissive material. As another example, the microcontroller can generate or cause a notification or indicator to be presented at the display, keyboard assembly, etc. that alerts the user to the luminant charge level of the light emissive material of the keyboard assembly. In this manner, the user is not required to put the keyboard into a dim environment in order to determine whether the light emissive material will be bright enough to use in that environment. In one or more embodiments, the notification includes a message, icon, color indicator, etc. that indicates an illumination intensity or charge level of the chargeable light emissive material. The notification can be presented via a display device such as a computer monitor or a dedicated indicator display or light of the computing device or keyboard assembly. Additionally or alternatively, the notification can include a recommendation for user action (e.g., a statement informing the user to "close the laptop lid so that the display can charge the photoluminescent portions of your keyboard").

These and other embodiments are discussed below with reference to FIGS. 1-7. However, those skilled in the art will readily appreciate that the detailed description given herein with respect to these figures is for explanatory purposes only and should not be construed as limiting. Furthermore, as used herein, a system, a method, an article, a component, a feature, or a sub-feature comprising at least one of a first option, a second option, or a third option should be understood as referring to a system, a method, an article, a component, a feature, or a sub-feature that can include one of each listed option (e.g., only one of the first option, only one of the second option, or only one of the third option), multiple of a single listed option (e.g., two or more of the first option), two options simultaneously (e.g., one of the first option and one of the second option), or combination thereof (e.g., two of the first option and one of the second option).

Figure 1:
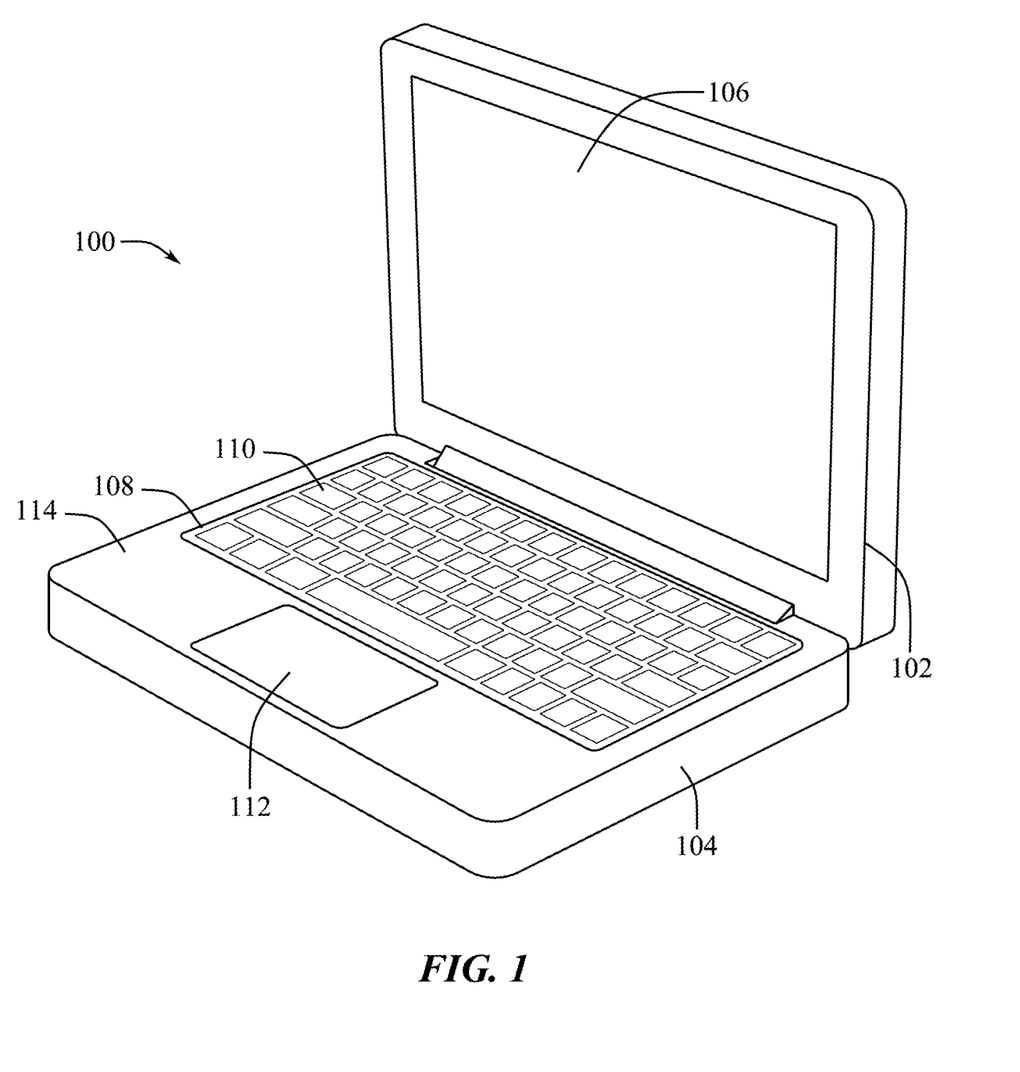
FIG. 1 illustrates an example embodiment of a computing device having a display housing attached to a keyboard housing.

FIG. 1 illustrates an example embodiment of a computing device 100 having a display housing 102 attached to a keyboard housing 104. The display housing 102 can include a display 106. The keyboard housing 104 can include a keyboard 110 and a trackpad 112 that are accessible through a top surface 114 of the keyboard housing 104. The keyboard housing 104 can also include a key web 108, which defines a portion of the top surface 114 between and/or around individual keys (or key mechanisms) of the keyboard 110 and which includes multiple openings through which keys of the keyboard 110 can extend to be accessible by the user.

The computing device 100 is shown in FIG. 1 as being a laptop computer, but the computing device 100 can include a variety of different types of computing devices, such as notebook computers, desktop computers, tablet computers, smart phones, servers, similar devices, and combinations thereof. Furthermore, the keyboard housing 104 can be a peripheral input device that is connectable to a computing device (e.g., via a wired or wireless connection) such as a standalone keyboard, a number input pad (e.g., "tenkey" pad), a trackpad, mouse, or other pointer input device, a graphic pen tablet, similar devices, and combinations thereof. Thus, the computing device 100 is shown merely as an example device with which aspects of the present disclosure are illustrated for convenience in providing an explanation and should not be viewed as limiting to a laptop computer.

Generally, with a laptop computer-like computing device 100, a processor, memory device, electronic storage device, portable power source or power source connector, circuit boards, keyboard and trackpad controllers, and other related electronic components can be stored in the keyboard housing 104 and/or the display housing 102. Thus, the computing device 100 can include all electrical devices and components necessary for operation of a keyboard 110 including keyboard switches and displays connected to one or more of the keys of the keyboard 110.

Figure 2:
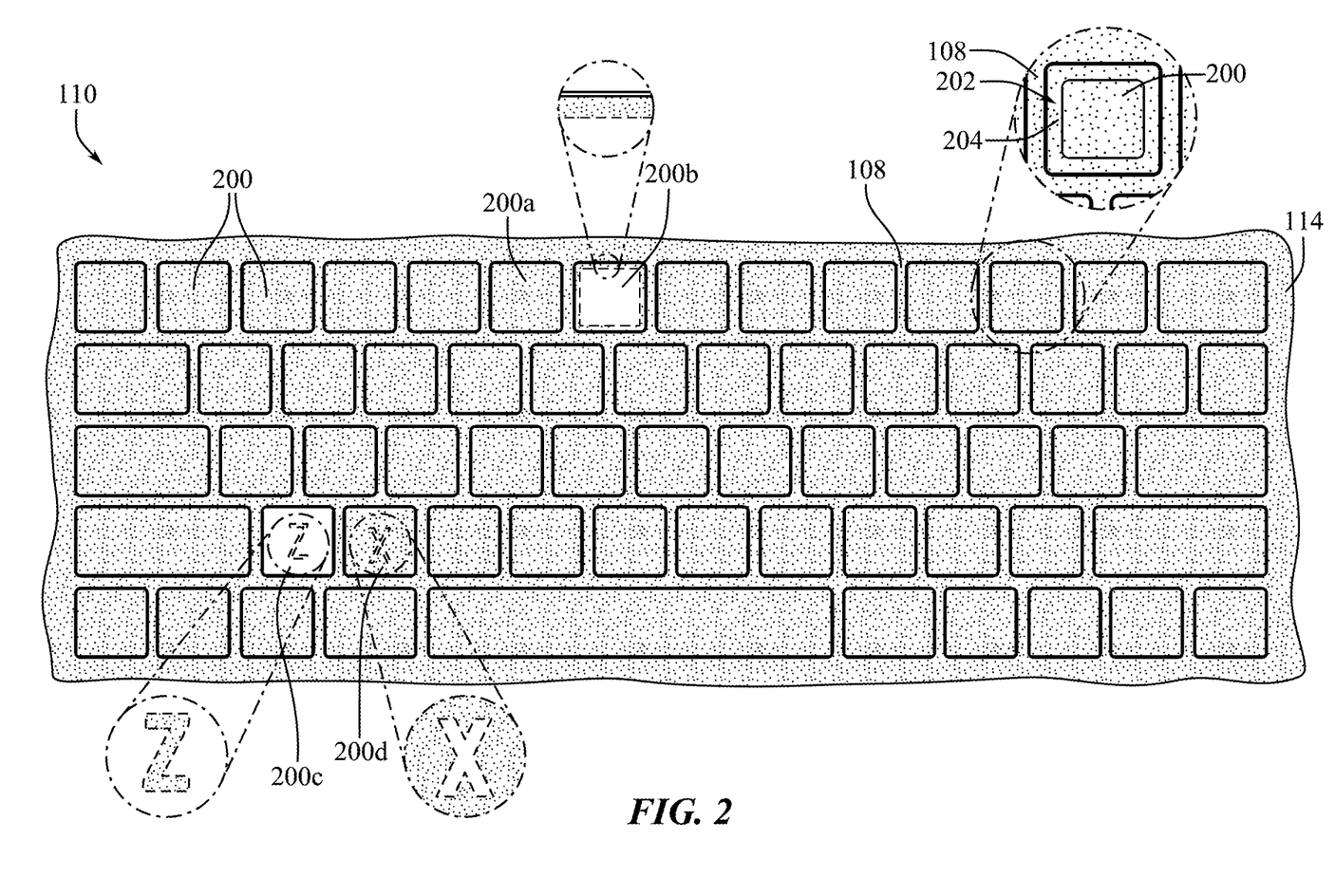
FIG. 2 illustrates a top view of an example keyboard positioned in a top surface of a keyboard housing 104.

FIG. 2 illustrates a top view of the keyboard 110 positioned in the top surface 114 of the keyboard housing 104. The keyboard 110 includes a set of key mechanisms with keycaps 200 visible at the top of the keyboard 110. In some embodiments, the key web 108 can extend between the keycaps 200 to form a mesh-like frame surrounding the perimeter of many or all of the keycaps 200. The key web 108 can form part of the top surface 114 of the keyboard housing 104 (as described above). Alternatively, the key web 108 can be a separate part positionable between the keycaps 200 and attachable to structures within, or that are part of, the keyboard housing 104.

The keyboard 110 is depicted with a dotted pattern which represents the position of a chargeable light emissive material. As used herein, the term "chargeable light emissive material" refers to one or more elements capable of being charged (and recharged) to persistently emit light after exposure to light from a light source that may be visible or invisible. In some embodiments, a chargeable light emissive material includes a mixture, alloy, or combination of elements with chargeable, light-emitting properties. A chargeable light emissive material can include a coating or layer (e.g., a dip coating or paint layer). A chargeable light emissive material can also include a discontinuous or weighted application of sprayed or printed material (e.g., particles, strips, layers, flecks, grains, drops, etc.). An example of a chargeable light emissive material includes luminescent materials (whether organic and/or synthetic). As some particular examples, a chargeable light emissive material includes ultraviolet phosphors, blue light emitting diode phosphors, infrared emitting phosphors, Anti-Stokes phosphors (i.e., up-converters), glow-in-the-dark phosphors, x-ray phosphors, and storage phosphors. Other examples of a chargeable light emissive material include radioluminescent materials and cathodoluminescent materials.

FIG. 2 shows the chargeable light emissive material disposed across the entirety of the keyboard 110. However, those of ordinary skill in the art will appreciate that the chargeable light emissive material can be applied in myriad different ways, including selective applications at certain portions of the keyboard 110 (but not other portions).

For example, in some embodiments, a surface of the keycaps 200 or a sub-surface portion within the keycaps 200 can include the chargeable light emissive material. In this example, a body of the keycaps 200 can include the chargeable light emissive material. In particular embodiments, a particular portion of the keycap body can include the chargeable light emissive material. For instance, a keycap 200a includes a top surface having the chargeable light emissive material. In another instance, a keycap 200b includes a perimeter portion or border outline having the chargeable light emissive material. Additionally or alternatively, a layer (e.g., a glyph layer, as shown for a keycap 200c) applied to the body of the keycaps 200 can include the chargeable light emissive material. Similarly, an area surrounding a glyph of a keycap can include a chargeable light emissive material (e.g., as shown in one example keycap 200d). See also FIG. 6 and the associated description for additional or alternative details.

In yet another example, the key web 108 can include the chargeable light emissive material. In certain embodiments, the key web 108 defines a gap 202 surrounding the keycaps 200. Visible through the gap 202 lies a substrate 204. The substrate 204 is positioned underneath the key web 108 and the keycaps 200. In certain implementations, the substrate 204 can include the chargeable light emissive material (as described further below in relation to FIG. 7).

In one or more embodiments, a glyph (or corresponding glyph layer) can include letters, numbers, symbols, shapes, lines, words, phrases, pictures, and other visual indicators used to convey information to the observer such as the function of the keycap 200 when it is pressed. In some instances, a glyph can also include indicators for the status or operation of the computing device 100 as a whole, such as a caps lock indicator, a volume, brightness, power, or other computer function modifier, and combinations thereof.

Figure 3:
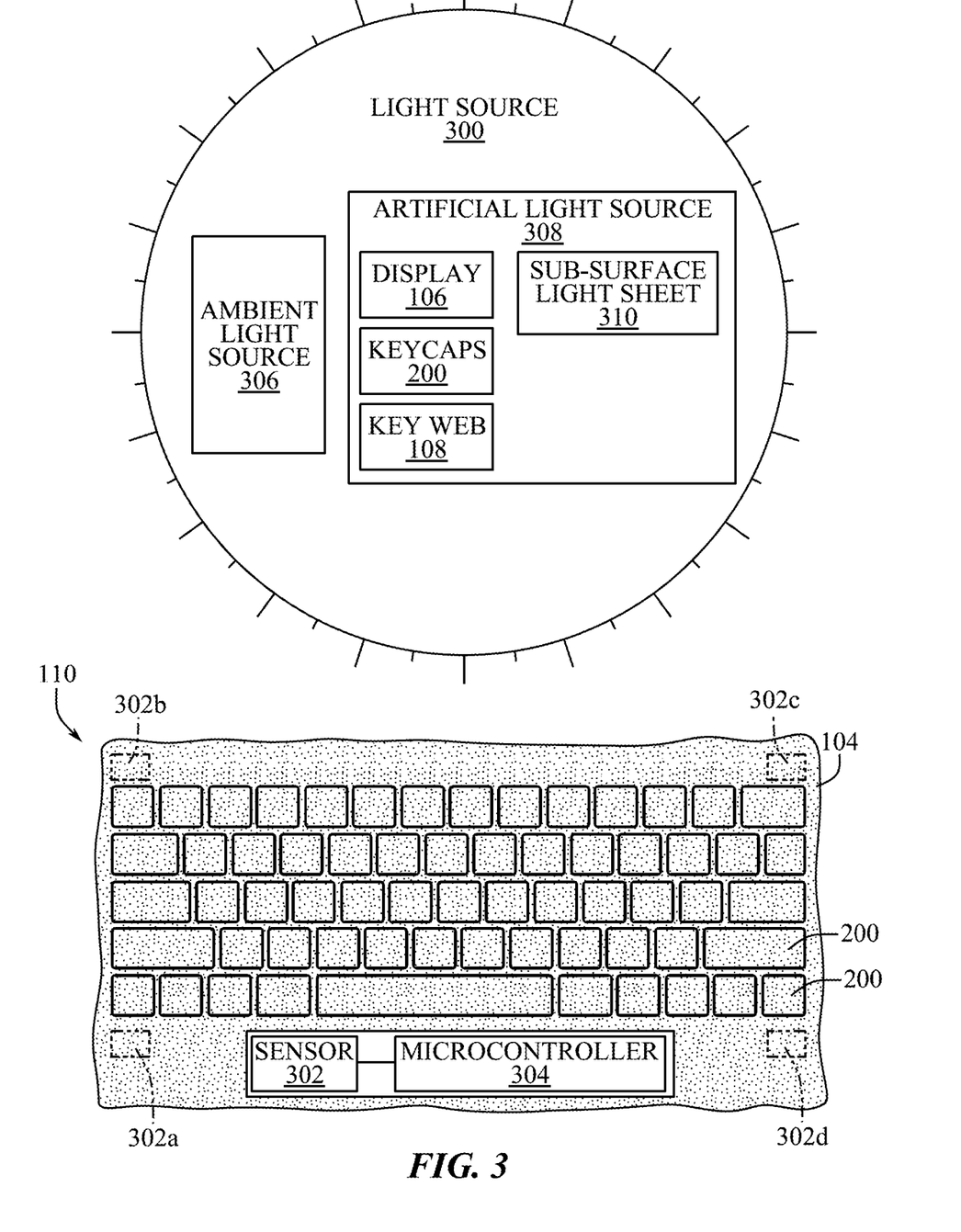
FIG. 3 illustrates an example of a keyboard including a sensor and a microcontroller.

FIG. 3 illustrates an example embodiment of a keyboard 110 including a sensor 302 and a microcontroller 304. In particular embodiments, the sensor 302 and the microcontroller 304 are configured to respond to light from a light source 300.

As indicated in FIG. 3, the light source 300 can include or be embodied as an ambient light source 306. The ambient light source 306 can include environmental light within the ambient environment of the keyboard 110 (e.g., natural light (e.g., from the sun, through a window, etc.), external artificial light (e.g., a nearby light fixture, lamp bulb, etc.), reflected light, similar light sources, and combinations thereof).

Further shown in FIG. 3, the light source 300 can include an onboard or on-device artificial light source 308 (e.g., light emitted from a computer device or component connected to the keyboard). The onboard artificial light source 308 can include light emitted by the display 106, keycaps 200, key web 108, or a sub-surface light matrix or light sheet 310 (e.g., as discussed below in relation to FIG. 7). In some embodiments, the ambient light source 306 and artificial light source 308 can include visible light and/or light invisible to the unaided human eye. In particular embodiments, the artificial light source 308 can include a chargeable light emissive material (e.g., on the keycaps 200, the key web 108, or the sub-surface light sheet 310). Examples of light emission from the ambient light source 306 and the artificial light source 308 (and corresponding light detection) are discussed further below. Thus, although light source 300 is schematically shown separate and apart from the keyboard 110 in FIG. 3, in some embodiments, the light source 300 is part of or within the keyboard 110 or is connected to the keyboard via an electronic connection.

Those of ordinary skill in the art will appreciate that the light source 300 can include one or more combinations of the ambient light source 306 and the artificial light source 308. For example, in certain embodiments, the light source 300 includes one or more types of ambient light supplemented by one or more types of artificial light (or vice-versa).

As used herein, an "unaided human eye" is a naked eye of an average human observer having regular vision and that is not augmented or supplemented by lenses, microscopes, cameras, or other scopes or equipment used to discern wavelengths beyond the natural human eye. In some embodiments, the unaided human eye, as referred to herein, can detect light of wavelengths from about 342 nanometers to about 770 nanometers.

Additionally, as used herein, the terms "sensor" or "light sensor" refer to a device configured to sense, detect, capture, measure, or estimate light (or associated properties of light). A sensor can generate sensor data (i.e., output electrical signals or reactive changes in electrical properties of the sensor) based on the light detected, sensed, captured, measured, or estimated. Examples of a sensor include a camera, image sensor, light detector, optical transducer, photovoltaic sensor (e.g., solar cell), photoresistor, phototransistor, photodiode, photodetector, pyroelectric detector, flow injection analysis device, etc. Additional examples of a sensor include an ambient light sensor, photometer, light meter, illuminance meter, radiometer, optometer, datalogger, lux meter, chroma meter, spectrometer, spectrophotometer, spectroradiometer, charge coupled device, active-pixel sensor, etc.

Further, as used herein, the term "microcontroller" refers to a device capable of generating an electrical (or digital) signal responsive to sensor data from a sensor (e.g., the sensor 302). In one or more embodiments, a microcontroller includes any of a variety of processors (e.g., a system on chip, integrated circuit, driver, application processor, crossover processor, etc.). In some embodiments, a microcontroller further includes one or more memory devices (e.g., individual nonvolatile memory, processor-embedded nonvolatile memory, random access memory, memory integrated circuits, DRAM chips, stacked memory modules, storage devices, memory partitions, etc.). In particular embodiments, a microcontroller further includes one or more of input/output ports, counters, timers, etc. It will be appreciated by those of ordinary skill in the art that such a microcontroller can be mounted on a printed circuit board (e.g., a rigid circuit board or a flexible printed circuit).

In one or more embodiments, the sensor 302 is disposed on or within the keyboard housing 104. In particular embodiments, the sensor 302 is positioned such that light detected by the sensor 302 is indicative of light incident onto the chargeable light emissive material. For example, the sensor 302 can be positioned at a location where the light detected by the sensor 302 includes an approximately equivalent or equivalent illumination intensity (e.g., a similar illuminance or lumens per square meter) as the incident light to the keycaps 200, and, in some embodiments, "approximately equivalent" refers to +/−10% of the illumination intensity. Accordingly, in some embodiments, the sensor 302 is positioned adjacent to the keycaps 200 on or near an outer surface of the housing of the keyboard. In particular embodiments, the sensor 302 is positioned between two adjacent keycaps 200 on the key web 108, within the key web 108, or in a space or gap between a keycap 200 and the key web 108. In certain embodiments, the sensor 302 is positioned adjacent to the trackpad 112 (not shown). In some embodiments, the sensor 302 is embedded in the keyboard housing 104 (e.g., the housing's sub-surface), where light is transmitted through the top surface 114 via a perforation and/or light guide at the top surface to the sensor 302.

In some embodiments, the sensor 302 is positioned on the apparatus based on a distance from the light source 300. For example, if the light source is the display 106, the sensor 302 can be positioned at a first distance away from the display 106 for a more conservative light estimation, or positioned at a second distance away from the display 106 for a more aggressive light estimation. In this example, the second distance to the display 106 is less than the first distance to the display 106.

In certain implementations, distance to the display 106 can be used as a way to tune illumination sensitivity or an accuracy of illumination output detection. To illustrate, the sensor 302 can be positioned on the apparatus relative to the display 106 where a threshold amount of total illumination by the display 106 can be detected despite measurement loss/error or due to some of the illumination being imperceptible due to light dispersion (i.e., photons emitted/scattered/reflected outside the field of view of the sensor 302). For instance, the sensor 302 can be positioned on the apparatus relative to the display 106 so as to capture or estimate at least about 50% of the total illumination output from the display 106, capture or estimate at least about 80% of the total illumination output from the display 106, capture or estimate at least about 95% of the total illumination output from the display 106, etc. In other instances, the sensor 302 can be positioned on the apparatus relative to the display 106 so as to have a field of view of a predetermined portion of the display 106 (e.g., a particular display region or corner). Similarly, in some instances, the sensor 302 can be positioned on the apparatus relative to the display 106 so as to have a field of view of a predetermined dimension or pixel count of the display 106. The predetermined portion of the display can be a representative portion of the display, wherein the sensor is enabled to infer the amount of illumination provided to the keyboard and/or emissive material based on the light measured from the representative portion.

In certain embodiments, the sensor 302 includes an arrangement or positional configuration of multiple sensors. For example, the sensor 302 can include a first sensor at a first position on the key web 108, a second sensor at a second position on the key web 108, a third sensor at a third position on the key web 108, and a fourth sensor at a fourth position on the key web 108. An example of such a configuration includes sensors 302a-302d shown at opposing corners or regions of the keyboard 110. In this manner, multiple sensors can account for properties of light that vary across the width, length, and/or depth of the keyboard 110. Such an arrangement can be advantageous in situations of uneven ambient lighting (e.g., sunlight directly illuminating only half of the keyboard 110).

In these or other embodiments, the sensor 302 can detect light or an associated property of light, as mentioned above. In some embodiments, the sensor 302 determines an illumination intensity (i.e., illuminance) of the light source 300. In other embodiments, the sensor 302 determines luminous flux, luminous intensity, luminance, incidence, reflection, diffusion, absorption, reflection, refraction, diffraction, interference, dispersion, scattering, polarization, irradiance, frequency, wavelength, color, pattern, duration of light exposure, etc. One or more of these light characteristics can be monitored, measured, or estimated to estimate the characteristics of light emitted by the chargeable light emissive material after exposure to the light source 300.

Based on the detected light, the sensor 302 generates sensor data. In one or more embodiments, the sensor 302 can generate sensor data that includes data strings, vectors, tables, graphs, etc. that include values identified by the sensor 302. In some embodiments, the sensor 302 can generate an electrical signal that is readable by the microcontroller 304 which calculates or generates data strings, vectors, tables, graphs, etc.

Thus, the microcontroller 304 can process the sensor data. In one or more embodiments, processing the sensor data includes implementing statistical analysis. For example, in the case of multiple sensors, the sensor 302 can generate multiple data values (or sets of data values) that can be combined, averaged, weighted, etc. In certain embodiments, the microcontroller 304 uses a conservative processing method by weighting or only implementing certain data values (e.g., indicative of the lowest illumination intensities) to compensate for variation in light properties across the keyboard 110.

In other embodiments, processing the sensor data includes tracking the sensor data over time (e.g., via one or more timers or counters for duration measurement). Based on the sensor data over time, the microcontroller 304 can implement one or more corresponding algorithms for determining energy measure, output, absorption, etc. as a function of time.

To illustrate, the microcontroller 304 can use the light detected by the sensor 302 to estimate the incident light from the display 106 (or other light source) onto the chargeable light emissive material of the keyboard 110 for estimating a charge level of the chargeable light emissive material. For example, the microcontroller 304 can use an illumination intensity measurement of the illumination output of the display 106, a time value (e.g., a duration value since the display 106 has been turned on), and/or a photoluminescence material absorption (or decay) model to determine a charge level of the chargeable light emissive material.

In other examples, the microcontroller 304 uses a different estimation approach. For example, as will be described below in relation to FIG. 4, the sensor 302 may have a field of view that includes the keyboard 110 with the chargeable light emissive material. In this case, the microcontroller 304 can directly identify and measure light detected by the sensor 302 as an illumination output of the chargeable light emissive material to estimate a corresponding charge level based on the direct measurement of the light from the material rather than inferentially estimating a charge level based on measuring characteristics of the light that would be charging the material. In some embodiments, the microcontroller 304 can estimate a charge level of the light emissive material based on a combination of direct and inferential methods.

As used herein, the term "charge level" refers to an amount of energy or display of energy for a chargeable light emissive material. In particular embodiments, a charge level can be measured or estimated. For example, a charge level can be a percentage value of illumination intensity compared to a full charge at maximum illumination intensity or a full charge at a typical full illumination intensity based on typically expected usage conditions. A charge level can also include a time value, such as an estimated time remaining until charge depletion or until the charge or light emission of the material decays below a predetermined visual brightness threshold value (e.g., less than about 20% of maximum brightness or less than about 2 lux). As another example, a charge level can include an output value, such as an actual illumination intensity measurement of the chargeable light emissive material.

Upon processing the sensor data, the microcontroller 304 can generate an electric (analog or digital) signal. In one or more embodiments, the signal can be used to perform different functions. For instance, the signal from the microcontroller 304 can cause another device (or component) to execute one or more sets of computer-executable instructions.

To illustrate, the signal from the microcontroller 304 can cause the display 106 to alter an illumination output of the display 106 in response to the sensor data indicating a predetermined charge level or range of charge levels. As an example, the microcontroller 304 can transmit a charge signal to the display 106 causing the display 106 to change or transition from a first illumination output configuration to a second illumination output configuration that differs from the first illumination output configuration. The charge signal can indicate a charge level of the chargeable light emissive material has fallen below a threshold charge level (e.g., about 10% of full charge level). Therefore, in response to the charge signal, the keyboard 110 can change an illumination output configuration of the display 106 to include a particular color, illumination intensity, displayed pattern, output wavelength, etc. to recharge the chargeable light emissive material.

In some embodiments, the modified illumination output of the display 106 can be optimized based on properties of the chargeable light emissive material. This can improve the efficiency of charging the chargeable light emissive material. For example, in some embodiments, the microcontroller 304 can generate a signal that indicates or determines that certain charge regions of the chargeable light emissive material are target spots (e.g., relatively weak or strong glow spots) where more or less charging is needed for consistent light emission across the keyboard. In turn, the display 106 can intensify or weaken certain display regions of the display 106 that target the indicated charge regions. As another example, the display 106 can use tailored patterns, colors, or wavelengths at different display regions in response to the signal from the microcontroller 304. In some embodiments, the tailored pattern can include a keyboard layout pattern, wherein when the display 106 is positioned parallel to and over the keyboard, the pattern on the display 106 has generally key-shaped regions that are configured to illuminate one or more keys of similar size that are facing the display 106. See also FIGS. 5A-5B. In this manner, the microcontroller 304 can cause devices or components to tailor a charge response that improves a charging efficiency of the chargeable light emissive material. Currently-dim keys can be charged with brighter display regions, and currently-bright keys can be charged (if at all) with relatively lower-brightness display regions. Areas that do not have any chargeable light emissive material can be positioned corresponding with display regions that are black or relatively dark since light from the display 106 would not affect a charge level of those areas.

Furthermore, the display 106 can transition from a first illumination output to a second illumination output in various configurations. For example, for a display 106 positioned in a laptop, when the device is in an open laptop configuration or a separate, standalone keyboard is connected, the display 106 can dynamically change the illumination output, such as by increasing brightness when keyboard material needs to be charged (whether the display 106 is currently in use by the user or inactive). In certain embodiments, the microcontroller 304 can mitigate a noticeable change in the illumination output while the display 106 is in use by causing the display 106 to output (or increase output of) light invisible to the unaided human eye (e.g., ultraviolet emission to charge the chargeable light emissive material). A closed laptop (i.e., clamshell) configuration is discussed further below in relation to FIGS. 5A-5B.

Figure 5A:
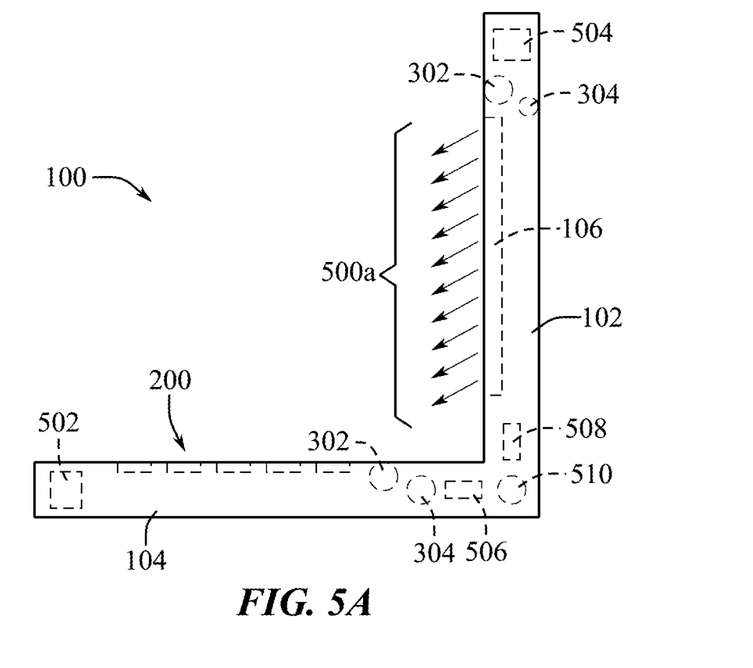
FIGS. 5A-5B respectively illustrate side views of open and closed example configurations of a computing device.
Figure 5B:
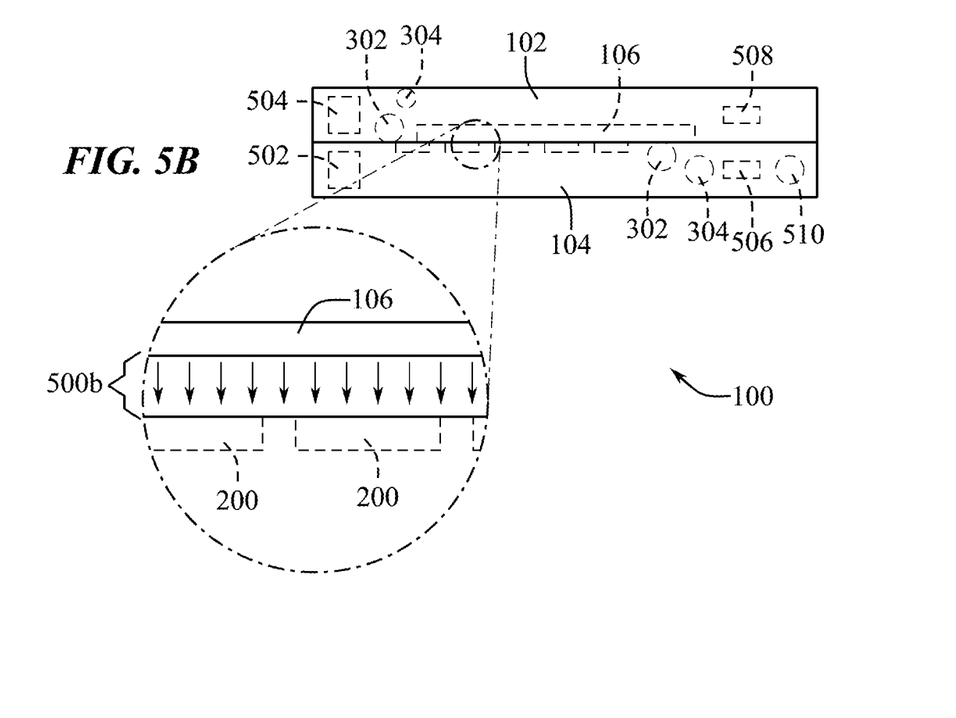

The signal from the microcontroller 304 can also cause other actions. For example, the microcontroller 304 can cause the display 106 to provide a notification or user recommendation, thereby updating a presentation of the display 106. For example, the display 106 can generate a window or other display region via an operating system that presents information to the user about the status of the light emissive material of the keyboard. In some embodiments, the notification includes a charge level percentage. In other embodiments, the notification includes a charge status notification (e.g., low charge, fully charged, etc.). In one or more embodiments, the user recommendation can include presented instructions to the user to close the laptop lid (i.e., display housing 102) so that the display 106 can more efficiently charge the chargeable light emissive material on the keyboard 110 (as shown in FIGS. 5A-5B). As another example, the user recommendation includes instructions to modify an orientation of the display 106 relative to the keyboard 110, thereby positioning the display 106 at a more advantageous angle to the keyboard 110 for light emitted by the display 106 to charge the light emissive material. In some embodiments, the angle can be optimized to still allow the user to operate the computing device from a normal usage position (e.g., seated in front of the device while viewing the display 106 and within range of the user's hands contacting the keyboard).

In one or more embodiments, the microcontroller 304 can generate a signal causing the notification or user recommendation to display elsewhere. For example, a standalone keyboard can, in response to the signal from the microcontroller 304, display an indicator light indicating a low charge level of the emissive material of the keyboard 110. As another example, a backside of the display housing (i.e., opposite the user-facing front side when the user is operating the computing device) can, in response to the signal from the microcontroller 304, display an indicator light indicating a charge level status—which is advantageous when the display housing is closed over the keyboard 110 in a clamshell charging configuration.

The sensor 302 and the microcontroller 304 can operate together to provide charge level updates (e.g., a current charge level that is updated over time). In some embodiments, the charge level updates can occur at certain time increments (e.g., by sampling an illumination intensity at predetermined intervals and generating a corresponding charge level signal). In other embodiments, the charge level updates can occur in real time or near-real time by sampling an illumination intensity on a continuous basis and generating a corresponding charge level signal).

It will be appreciated by those of ordinary skill in the art that the microcontroller 304 generates and transmits signals that are non-transitory. Furthermore, the microcontroller 304, the sensor 302, and/or other components or external devices can be communicatively coupled (e.g., for signal transmission) using a variety of network interfaces or network connections—whether wired or wireless. For example, the components and/or computing devices of the present disclosure can implement a wireless local area network, wireless area network, wireless personal area network, wide area network, etc. Some particular examples of wireless communication include a Wi-Fi based communication, mesh network communication, BLUETOOTH® communication, near-field communication, low-energy communication, ZIGBEE® communication, Z-wave communication, and 6LoWPAN communication. Other forms of communication include wire-based communications via USB connection, UART connection, USART connection, I2C connection, SPI connection, QSPI connection, etc.

Figure 4:
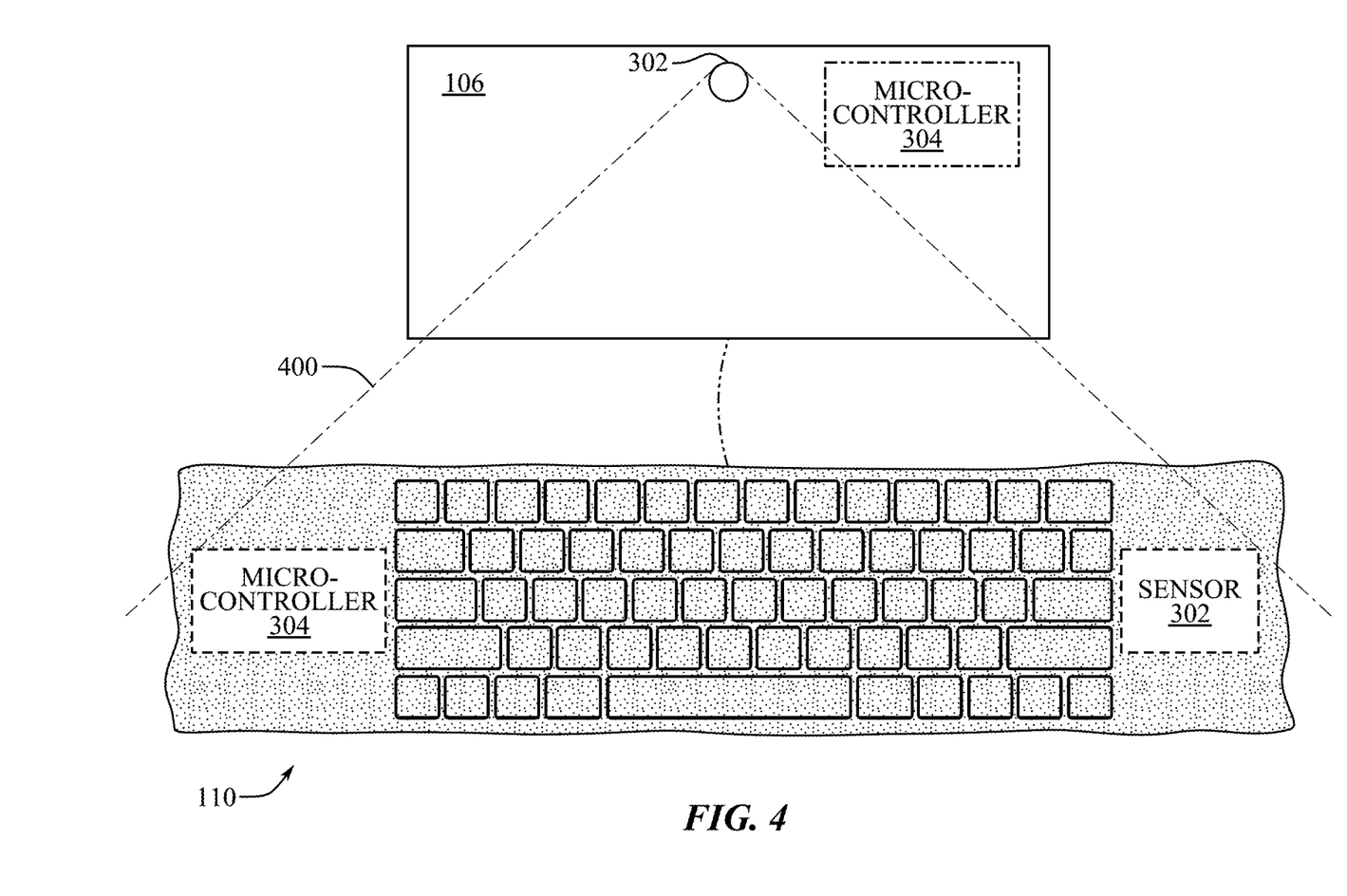
FIG. 4 illustrates another example of a display and a keyboard.

FIG. 4 illustrates an example embodiment of the display 106 and the keyboard 110 of the present disclosure. The display 106 is coupled to the keyboard 110 via a broken line indicative of a wired or wireless coupling for standalone keyboard configurations, or indicative of an integrated display housing and keyboard housing coupling (e.g., as shown in FIG. 1). In some embodiments, the display 106 can include one or more sensors 302. In certain implementations, the sensor 302 of the display can include a camera. However, other types of sensors, as described above, can also be implemented.

In one or more embodiments, the sensor 302 has a field of view 400. The field of view 400 can be configured and oriented to view and capture an image or series of images (e.g., video) of the keyboard 110, including light emitted from the keyboard 110 via a chargeable light emissive material of the keyboard 110. In certain embodiments, the field of view 400 can be directed specifically towards the keyboard 110 to exclude light sources other than the chargeable light emissive material. Similarly, in some configurations, information within the field of view 400 of the sensor 302 that is provided to a microcontroller (e.g., 304) can be ignored or excluded that does not coincide with the position of the keyboard 110. Within the field of view 400, the sensor 302 can detect various properties of light, as discussed above, including light emitted from the light emissive material of the keyboard 110.

For example, the sensor 302 can detect an illumination intensity of the chargeable light emissive material (e.g., on or within the keycaps 200). In some embodiments, the sensor 302 detects an illumination intensity of light incident onto a lens or other component of the sensor 302. In certain implementations, the sensor 302 detects an illumination intensity from light of a predetermined range of accepted wavelengths (e.g., to exclude light sources other than the chargeable light emissive material). Similarly, in some embodiments, the sensor 302 detects an illumination intensity from light incident onto the sensor 302 at a predetermined range of incident angles (e.g., that coincide with angles based on a position of the keyboard 110 relative to the display 106). As another example, the sensor 302 can determine brightness and uniformity (e.g., gradients of brightness) of light falling across the keyboard 110.

In one or more embodiments, the microcontroller 304 (at the display 106 and/or the keyboard 110) uses the sensor data from the sensor 302 to estimate and track a charge level of the chargeable light emissive material of the keyboard 110. For instance, the microcontroller 304 can use an illumination intensity measurement of the illumination output of the chargeable light emissive material, a time value (e.g., a duration value since the last full charge), and/or a photoluminescence material absorption (or decay) model to determine a charge level of the chargeable light emissive material in real time. In another example, the microcontroller 304 can use one or more previous illumination intensity measurements, together with a current illumination intensity measurement, to project a charge level curve as a function of time and to use the curve to predict future intensity, duration of emission, similar properties, and combinations thereof.

Based on the determined charge level, the microcontroller 304 can generate a signal (as described above). For example, the microcontroller 304 can generate a signal that causes the display 106 to change an illumination output of the display 106 (e.g., to charge the chargeable light emissive material). As another example, the microcontroller 304 can generate a signal that causes the display 106 (or the keyboard 110) to present a notification or a user recommendation to the user via text or graphics displayed on the display 106. In some embodiments, an audible notification can be provided via an audio output device (e.g., speaker) or a haptic notification can be provided via a haptic interface device (e.g., a piezoelectric vibrator or similar device).

Other configurations of the sensor 302 and the microcontroller 304 are also herein contemplated. For example, additional or alternative sensor(s) and/or microcontroller(s) can be implemented in the keyboard 110, as described above.

FIGS. 5A-5B respectively illustrate side views of open and closed example configurations of the computing device 100 in accordance with one or more embodiments of the present disclosure. As shown in FIG. 5A, the display 106 provides an illumination output 500a when in the open configuration. In particular embodiments, the illumination output 500a is incident upon the keycaps 200. In at least some embodiments, the illumination output 500a can include a regular illumination output for the ordinary course of viewing and/or using the display 106 for general computing tasks such as viewing webpages, videos, documents, etc. In other configurations, the illumination output 500a can include a light-emissive-material-charging-optimized illumination output that is compatible with in-use (i.e., ordinary viewing) activity. For instance, the illumination output 500a can include an illumination output with light of a wavelength invisible to the unaided human eye that is optimized for charging light emissive material.

Further shown in FIG. 5A, the computing device 100 can include one or more sensors for identifying a configuration of the computing device 100. The computing device 100 can include one or more sensors for identifying whether the display housing 102 is closed on top of the keyboard housing 104 (as shown in FIG. 5B), whether the display housing 102 is fully opened and retracted away from the keyboard housing 104, or whether the display housing 102 is at a partially open position. For example, the one or more sensors can include an angle or position sensor configured to detect the angle of the display/lid housing 102 relative to the keyboard/base housing 104.

To illustrate, the computing device 100 can include lid sensors 502-508 and/or a hinge sensor 510. In some embodiments, the lid sensors 502-508 can detect the presence of a corresponding lid sensor. For example, a base sensor 502 can sense the position of a lid sensor 504 or display housing 102 relative to the base housing 104, and/or vice-versa. For instance, the base sensor 502 or lid sensor 504 can include a ferromagnetic material (e.g., iron), a permanent magnet, an electromagnet assembly, and/or a magnetic field sensor (e.g., a Hall-effect sensor). Thus, as the base sensor 502 and the lid sensor 504 are positioned in close proximity to each other, the magnetic field sensor of the base sensor 502 and/or the lid sensor 504 can identify a change in the magnetic field. A predetermined change (or strength) of the magnetic field can therefore indicate a closed configuration of the computing device 100.

The lid sensors 506, 508 can operate in a same or similar manner. Additionally or alternatively, the lid sensors 506, 508 can include pressure sensors, light sensors, etc. to determine whether the display housing 102 is closed on top of the keyboard housing 104, or to identify a different spatial positioning.

The lid sensors 502-508 can be positioned in myriad different locations on or within the computing device 100. Similarly, more or fewer lid sensors can be implemented, as may be desired. The positioning of the sensors 502-508 should therefore not be construed as limiting the sensors to being positioned only where shown in the figures.

The hinge sensor 510 can determine a hinge angle (e.g., an angle at which the display housing 102 is positioned relative to the keyboard housing 104). In some embodiments, the hinge sensor 510 measures rotation of a hinge (not shown) of the computing device 100 to identify the hinge angle. Other suitable methods of the hinge sensor 510 fall within the scope of the present disclosure.

In some embodiments, the sensor 302 and/or the microcontroller 304 can be used to implement one or more aspects of the present disclosure based on the position or configuration of the computing device 100. For example, the microcontroller 304 can cause the display 106 to present the illumination output 500a while one or more of the lid sensors 502-508 or the hinge sensor 510 indicate that the computing device 100 is in an open configuration (as shown in FIG. 5A). As another example, the microcontroller 304 can cause the display 106 to transition to presenting an illumination output 500b upon one or more of the lid sensors 502-508 or the hinge sensor 510 indicating that the computing device 100 is in a closed configuration (as shown in FIG. 5B).

FIG. 5B depicts the computing device 100 in an example closed configuration (e.g., as determined by the lid sensors 502-508 and/or the hinge sensor 510). In this closed configuration, the display housing 102 and the keyboard housing 104 are positioned to face each other. Specifically, the display 106 is brought in close proximity to the chargeable light emissive material (e.g., on the keycaps 200). In doing so, the display 106 can efficiently charge the chargeable light emissive material with less wastage of emitted light into the ambient environment of the keyboard. In other words, a higher proportion of the emitted light of the display 106 can be absorbed by the light emissive material of the keyboard due to its proximity when in the closed position.

For example, FIG. 5B depicts the display 106 providing the illumination output 500b. In one or more embodiments, the illumination output 500b includes a same or similar output as the illumination output 500a. In other embodiments, however, the illumination output 500b includes a modified illumination output. For instance, the illumination output 500b includes light of a different (e.g., greater) illumination intensity, different wavelength, different pattern, etc. than the illumination output 500a. For instance, with the display 106 in the closed position, the light and patterns emitted by the display can be optimized for charging the keyboard's material rather than for presenting pleasant and relevant information to an onlooker of the display 106. Light emissive material can therefore be charged more quickly, at higher display brightness, or by different wavelengths emitted from the display 106 as compared to when the device is in an open configuration. In some embodiments, this type of optimized charging can reduce the overall charging time per hour of the light emissive material as compared to when the device is charged by light from the display 106 while in the open configuration. In some embodiments, a user can quickly boost the light emission charge level of the keyboard by briefly exposing the keyboard to bright light from the display 106 while in the closed configuration, then can open the display and use the device normally afterward.

In a same or similar manner as described above, the sensor 302 in FIG. 5B can also sense the illumination output 500b from the display 106. Based on the detected illumination output 500b, the sensor 302 generates and transmits sensor data to the microcontroller 304. In turn, the microcontroller 304 generates and transmits a signal to the display 106, thereby causing the display 106 to continue providing the illumination output 500b or otherwise modify the illumination output 500b. In this manner, the sensor 302, the microcontroller 304, and the display 106 can operate together to tailor a charge response for the chargeable light emissive material on the keyboard 110.

In at least some embodiments, the illumination output 500b can be tuned, optimized, interrupted, overridden, or set based on one or more operational factors. For example, the illumination output 500b can be adjusted based on thermal output, power consumption, etc. of the computing device 100. As another example, the illumination output 500b can be adjusted based on other features of the computing device 100 and/or operating system software that can affect the illumination output 500b, such as the sleep functionality, awake functionality, etc.

Figure 6:
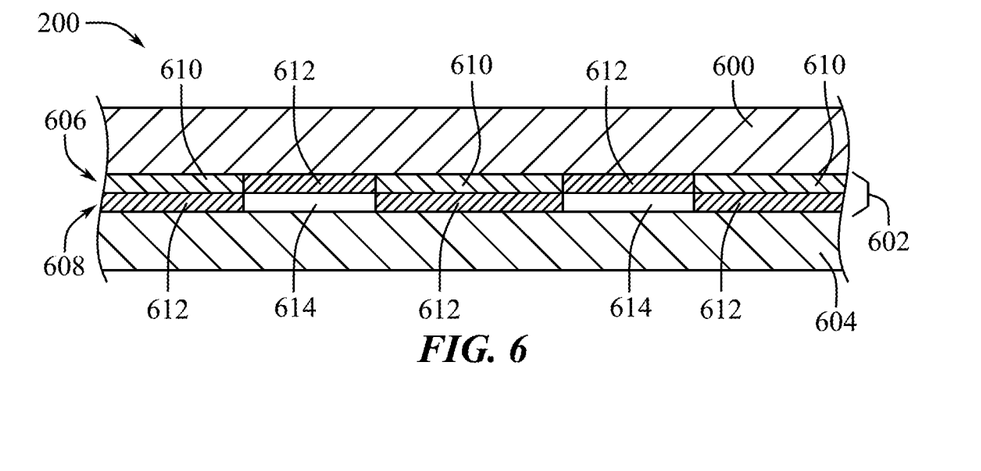
FIG. 6 illustrates a side section view of an example keycap.

As discussed above, the chargeable light emissive material can be broadly implemented on or within the keyboard 110 in a variety of different ways. In some embodiments, the chargeable light emissive material is included on or within the keycaps 200. For instance, the chargeable light emissive material is positioned on a body portion of the keycaps 200 (e.g., a photoluminescent keycap). In another instance, the chargeable light emissive material includes a top layer of the keycaps 200 with a glyph portion removed (thereby exposing dark material underneath). Still, in other instances, the chargeable light emissive material includes a glyph artwork or glyph layer on top of a body portion (e.g., a dark body portion). In accordance with these or other embodiments, FIG. 6 illustrates a side section view of one of the keycaps 200. As shown the keycaps 200 includes a top portion 600, a middle portion 602 (e.g., a glyph layer), and a bottom portion 604.

In particular embodiments, the top portion 600 includes a transparent layer of one or more of the keycaps 200. In one or more embodiments, the transparent layer of the keycaps 200 comprises a protective layer or coating (e.g., a glass layer). In other embodiments, the top portion 600 includes a chargeable light emissive material.

Beneath the top portion 600, the middle portion 602 includes one or more layers 606, 608. The layers 606, 608 can include different sections, such as sections 610-614. In some embodiments, the sections 610-614 include the same material. In other embodiments, one or more of the sections 610-614 can comprise a different material or a material having different visual characteristics or appearance than another section. For example, at least one of the sections 610-614 can include a glyph portion. In certain embodiments, the glyph portion includes a chargeable light emissive material. In other embodiments, the glyph portion can include a dark material (e.g., a non-chargeable light emissive material).

In some embodiments, the glyph portion can be positioned in one or more sections (610, 612) of the layer 606. Additionally or alternatively, the glyph portion can be positioned in one or more sections (612, 614) of the layer 608.

Similarly, a chargeable light emissive material can be positioned in one or more sections of the layer 606. Additionally or alternatively, the chargeable light emissive material can be positioned in one or more sections of the layer 608. In some embodiments, one or more sections of the layers 606-608 can be adjusted (e.g., in size, shape, thickness, etc.) to accommodate the chargeable light emissive material. For instance, certain implementations of the keycaps 200 include at least a portion of one or more dark/non-emissive sections (without non-chargeable light emissive material) of the layer 606 being etched away or removed to expose the chargeable light emissive material underneath. As an example of an etched-away embodiment, the section 610 (e.g., of a dark material) in the layer 606 can be etched away to expose the section 612 (e.g., of a chargeable light emissive material) in the layer 608 underneath.

By contrast, certain embodiments of the keycaps 200 include at least a portion of one or more sections of the chargeable light emissive material being etched away or removed to expose a non-emissive material underneath. For instance, the section 610 (e.g., of a chargeable light emissive material) in the layer 606 can be etched away to expose the section 612 (e.g., of a non-emissive material) in the layer 608 underneath.

As another example, at least one of the sections 610-614 can include reflective or partially mirrored reflective coatings, material inserts, or inks. Incorporation of partially mirrored reflective coatings can allow backlight illumination (e.g., from a subsurface light sheet described in relation to FIG. 7) to pass through the middle portion 602 while also reflecting ambient light directed downward onto the keycaps 200. In certain implementations, at least one of the sections in the layer 606 can include a different width (e.g., reduced width) relative to one or more sections underneath (i.e., in the layer 608) to produce a "halo" effect of increased brightness (e.g., around the edge of a glyph portion at the outer edge of section 612 or the inner edge of section 610).

In yet another example, at least one of the sections 610-614 can include opaque or translucent materials such as, for example, inks or paints. In one embodiment, at least one of the sections 610-614 can include a translucent white material, and another of the sections 610-614 can include an opaque black material. In some embodiments, light emissive material can be integrated into (e.g., doped or otherwise mixed into) material used for one or more of sections 610-614 and can thereby impart photoluminescent properties to the section 610-614.

In a further example, at least one of the sections 610-614 are transparent or otherwise light-transmissive. For example, light from a subsurface light guide sheet 702 described in relation to FIG. 7 can pass through at least one of the sections 610-614 (e.g., to illuminate a glyph section, a section outlining a glyph portion, or multiple sections around a glyph portion).

Further shown in FIG. 6, a keycap 200 can include a bottom portion 604. The bottom portion 604 can act as a carrier body of a keycap 200 that supports the middle portion 602 and the top portion 600. In some embodiments, the bottom portion 604 can comprise a transparent material (e.g., a glass material), a polymer material, a light-blocking material (e.g., an opaque material), etc. An opaque or reflective bottom portion 604 can facilitate upward reflection of light emitted by a light emissive material in one of the upper layers 600, 602 to improve visibility of the light emissive material outside the keyboard. A bottom portion 604 including light emissive material can emit light through the upper layers 600, 602 or from an outer edge of the keycap 200 to provide improved brightness or a side-emitted light effect to the keycap 200.

Myriad different configurations and variations of the foregoing are herein contemplated. The top portion 600, the middle portion 602, and the bottom portion 604 can be sized and shaped differently than illustrated in FIG. 6. For example, the top portion 600 can include concave curvature (e.g., that is substantially cylindrically or spherically concave). The top portion 600 can also include one or more tactile features to assist a user in feeling a position of their finger relative to the top input surface. Still further, the middle portion 602 can include more or fewer layers. In one example, a single layer 606 is positioned between top portion 600 and bottom portion 604. A glyph can be defined in the layer sections 610, 612 using light emissive material positively (i.e., the light emissive material fills and defines the borders of the glyph, and material surrounding the glyph is non-emissive (or differently emissive, such as by having a different color, brightness, opacity, reflectivity, etc.)) or negatively (i.e., the light emissive material surrounds and defines the borders of the glyph which has a non-emissive (or differently emissive) material within its borders). In addition, the middle portion 602 can include sections of a different arrangement, dimension, positional relationship, etc.

Likewise, some embodiments of the keycaps 200 include additional or alternative components. For example, the keycaps 200 can include a light guide extending through the bottom portion 604 to one or more sections of the middle portion 602 (e.g., for light passage from chargeable light emissive material disposed beneath the keycaps 200 as discussed in relation to FIG. 7).

Figure 7:
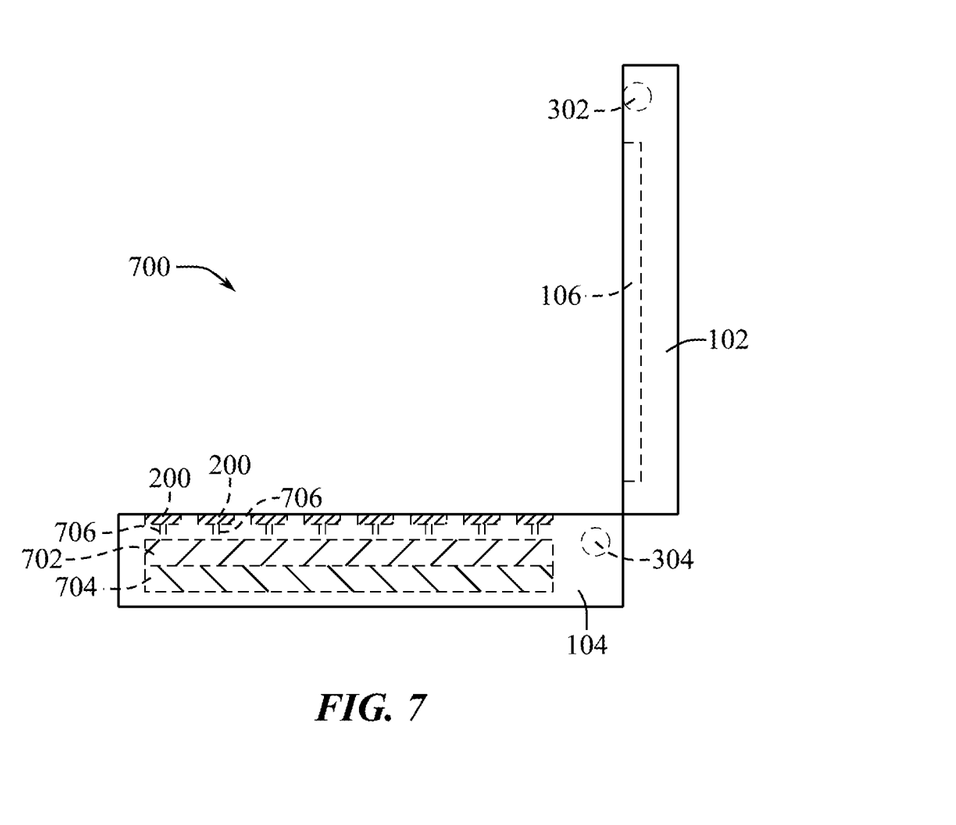
FIG. 7 illustrates a side view of another example computing device.

FIG. 7 illustrates a side view of an example computing device 700 in accordance with one or more embodiments of the present disclosure. The computing device 700 may be the same as or similar to the computing device 100 described above. In particular, the computing device 700 includes a sub-surface light guide sheet 702. The sub-surface light guide sheet 702 is the same as the sub-surface light sheet 310 discussed above.

In one or more embodiments, the sub-surface light guide sheet 702 includes a chargeable light emissive material. The chargeable light emissive material on the sub-surface light guide sheet 702 can therefore emit light for illuminating the keycaps 200 (or another portion of the keyboard 110, such as the key web 108). To do so, in some embodiments, the computing device 700 implements a light guide 706. The light guide 706 can transmit light from the chargeable light emissive material on the sub-surface light guide sheet 702 to the keycaps 200 (e.g., to illuminate a glyph portion). In one or more embodiments, the light guide 706 includes a light pipe (e.g., of glass or plastic material).

In some embodiments, the sub-surface light guide sheet 702 is charged via the light source 300 using one or more methods described above in relation to the foregoing figures. For example, ambient light or onboard artificial light can pass through or between the keycaps 200 to charge the sheet 702. In other embodiments, the sub-surface light guide sheet 702 is charged via one or more components of a substrate 704. The substrate 704 can be the same as or similar to the substrate 204 discussed above in relation to FIG. 2. For example, the substrate 704 can include one or more light emitting diodes (LEDs) or light emitting components that can charge the chargeable light emissive material on the sub-surface light guide sheet 702.

Additionally or alternatively to the chargeable light emissive material on the sub-surface light guide sheet 702, at least some implementations of the sub-surface light guide sheet 702 can include an active light source (e.g., LEDs or electroluminescent material) driven by a power or energy source connected to the substrate 704 (e.g., a battery, capacitor, or generator). To illustrate, the chargeable light emissive material on the sub-surface light guide sheet 702 can emit light in response to the application of an electrical signal (e.g., an electrical current or electric field) provided by the substrate 704, such as by including an electroluminescent material.

In some embodiments, the active light source can supplement a configurable amount of light for transmitting to the keycaps 200 (or other portion of the keyboard 110). For example, the microcontroller 304 can transmit to the active light source for dynamically providing an illumination output based on the charge level of the chargeable light emissive material (wherever positioned). To illustrate, in one instance the microcontroller 304 can transmit a signal to the active light source that causes the active light source to turn off during times of increased illumination output by the chargeable light emissive material.

Additionally, in some instances, the microcontroller 304 can transmit a signal to the active light source that causes the active light source to turn on (e.g., incrementally) as the charge level of the chargeable light emissive material decreases. Thus, the light emissive material can provide lighting of the keyboard at least temporarily without the additional power consumption needed to power the active light source (or with reduced/minimal power consumption by the active light source. Over time, as the light emissive material wanes in brightness, the active light source can be controlled (e.g., by the microcontroller 304) to gradually consume more energy to recharge the light emissive material or to supplement the light output by the keyboard to maintain a relatively consistent brightness and appearance of the keyboard over time. Similarly, in some instances, the microcontroller 304 can transmit a signal to the active light source that causes the active light source to turn off incrementally as the charge level of the chargeable light emissive material increases (e.g., during charging). The microcontroller 304 can also transmit signals to the active light source in response to sensor data from the sensor 302 indicating the chargeable light emissive material has fallen below or reached a threshold charge level (e.g., about 5% of full charge, about 20% of full charge, about 85% of full charge, etc.). In this manner, the chargeable light emissive material of the present disclosure can reduce (or in some cases eliminate) active power to provide backlight illumination in the keyboard 110. This reduction in power consumption can extend the battery life of portable devices and can offer users more versatility and environmental sustainability as it relates to the visibility characteristics of their devices and how they use them.

Figure 8:
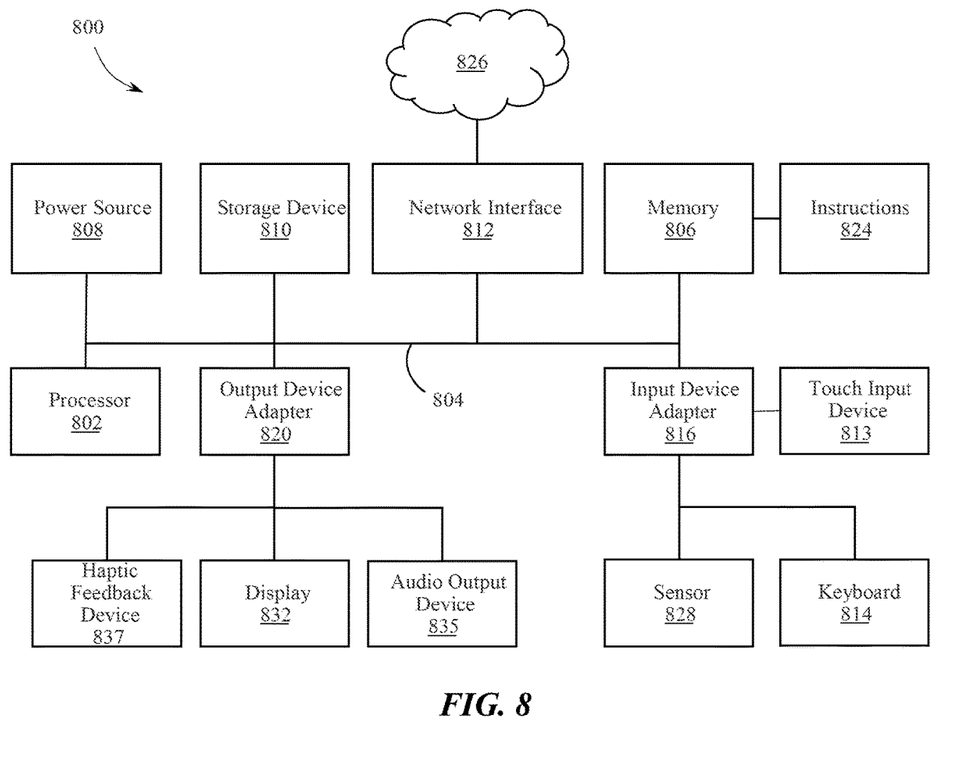
FIG. 8 is a block diagram of a computing system.

FIG. 8 shows a high-level block diagram of a computer system 800 that can be used to implement embodiments of the present disclosure. In various embodiments, the computer system 800 can comprise various sets and subsets of the components shown in FIG. 8. Thus, FIG. 8 shows a variety of components that can be included in various combinations and subsets based on the operations and functions performed by the system 800 in different embodiments. For example, the computer system 800 can be part of the computing devices (e.g., 100) and/or microcontrollers (e.g., 304) described above in connection with FIGS. 1-7. It is noted that, when described or recited herein, the use of the articles such as "a" or "an" is not considered to be limiting to only one, but instead is intended to mean one or more unless otherwise specifically noted herein.

The computer system 800 can comprise a central processing unit (CPU) or processor 802 connected via a bus 804 for electrical communication to a memory device 806, a power source 808, an electronic storage device 810, a network interface 812, an input device adapter 816, and an output device adapter 820. For example, one or more of these components can be connected to each other via a substrate (e.g., a printed circuit board or other substrate) supporting the bus 804 and other electrical connectors providing electrical communication between the components. The bus 804 can comprise a communication mechanism for communicating information between parts of the system 800.

The processor 802 can be a microprocessor or similar device configured to receive and execute a set of instructions 824 stored by the memory 806. The memory 806 can be referred to as main memory, such as random access memory (RAM) or another dynamic electronic storage device for storing information and instructions to be executed by the processor 802. The memory 806 can also be used for storing temporary variables or other intermediate information during execution of instructions executed by the processor 802. The processor 802 can include one or more processors or controllers, such as, for example, a CPU for the computing device 100 in general and a touch controller or similar sensor or I/O interface used for controlling and receiving signals from the sensor(s) (e.g., 302, 502-510). The power source 808 can comprise a power supply capable of providing power to the processor 802 and other components connected to the bus 804, such as a connection to an electrical utility grid or a battery system.

The storage device 810 can comprise read-only memory (ROM) or another type of static storage device coupled to the bus 804 for storing static or long-term (i.e., non-dynamic) information and instructions for the processor 802. For example, the storage device 810 can comprise a magnetic or optical disk (e.g., hard disk drive (HDD)), solid state memory (e.g., a solid state disk (SSD)), or a comparable device.

The instructions 824 can comprise information for executing processes and methods using components of the system 800. Such processes and methods can include, for example, the methods described in connection with other embodiments elsewhere herein, including, for example, the methods and processes described in connection with FIGS. 1-7.

The network interface 812 can comprise an adapter for connecting the system 800 to an external device via a wired or wireless connection. For example, the network interface 812 can provide a connection to a computer network 826 such as a cellular network, the Internet, a local area network (LAN), a separate device capable of wireless communication with the network interface 812, other external devices or network locations, and combinations thereof. In one example embodiment, the network interface 812 is a wireless networking adapter configured to connect via WI-FI®, BLUETOOTH®, BLE, Bluetooth mesh, or a related wireless communications protocol to another device having interface capability using the same protocol. In some embodiments, a network device or set of network devices in the network 826 can be considered part of the system 800. In some cases, a network device can be considered connected to, but not a part of, the system 800.

The input device adapter 816 can be configured to provide the system 800 with connectivity to various input devices such as, for example, a touch input device 813 (e.g., display 106 or trackpad), a keyboard 814 (e.g., 110) or other peripheral input device, one or more sensors 828 (e.g., 302, 502-510), related devices, and combinations thereof. The sensors 828 can be used to detect physical phenomena in the vicinity of the computing system 800 (e.g., light, sound waves, electric fields, forces, vibrations, etc.) and convert those phenomena to electrical signals. The keyboard 814 or another input device (e.g., buttons or switches) can be used to provide user input such as input regarding the settings of the system 800. In some embodiments, the input device adapter 816 can be connected to a stylus (e.g., 118) or other input tool, whether by a wired connection or by a wireless connection (e.g., via the network interface 812) to receive input via the touch input device 813 and via the tool.

The output device adapter 820 can be configured to provide the system 800 with the ability to output information to a user, such as by providing visual output using one or more displays 832, by providing audible output using one or more speakers 835, or providing haptic feedback sensed by touch via one or more haptic feedback devices 837. Other output devices can also be used. The processor 802 can be configured to control the output device adapter 820 to provide information to a user via the output devices connected to the adapter 820. In some embodiments, the processor 802 and sensor 828 can be used to detect light falling on the keyboard 814 or other touch input device 813 or to detect light emitted by the keyboard 814 or other touch input device 813, as further described above.

Any of the features, components, and/or parts, including the arrangements and configurations thereof shown in the figures can be included, either alone or in any combination, in any of the other examples of devices, features, components, and parts shown in one or more other figures described herein.

As used herein, conjunctive terms (e.g., "and") and disjunctive terms (e.g., "or") should be read as being interchangeable (e.g., "and/or") whenever possible. Furthermore, in claims reciting a selection from a list of elements following the phrase "at least one of," usage of "and" (e.g., "at least one of A and B") requires at least one of each of the listed elements (i.e., at least one of A and at least one of B), and usage of "or" (e.g., "at least one of A or B") requires at least one of any individual listed element (i.e., at least one of A or at least one of B).

To the extent applicable to the present technology, gathering and use of data available from various sources can be used to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, TWITTER® ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. A keycap assembly, comprising:
   a keycap comprising a chargeable light emissive material positioned at a surface of a body of the keycap;
   a light sensor configured to sense light incident to the light sensor and to the chargeable light emissive material at the surface of the body of the keycap from a light source external to the keycap assembly; and
   a microcontroller comprising:
      a processor; and
      a memory device storing instructions that, when executed by the processor, cause the microcontroller to:
      receive an electrical signal from the light sensor; and
      determine an amount of illumination energy emitted from the surface of the body of the keycap by the chargeable light emissive material based on the electrical signal.

2. The keycap assembly of claim 1, wherein:
   the light sensor is disposed on or within a keyboard housing adjacent to the keycap.

3. The keycap assembly of claim 2, wherein the incident light from the light source corresponds to an ambient light source or an artificial light source including a display of a computing device.

4. The keycap assembly of claim 1, wherein the amount of amount of illumination energy emitted by the chargeable light emissive material is determined based on a duration of time that the light sensor detects light from the light source.

5. The keycap assembly of claim 1, wherein the electrical signal comprises an illuminance measurement identified by the light sensor.

6. The keycap assembly of claim 5, wherein the illumination intensity of the chargeable light emissive material corresponds to the illuminance measurement.

7. The keycap assembly of claim 1, wherein the keycap comprises the chargeable light emissive material in a glyph layer positioned over a second layer.

8. The keycap assembly of claim 1, wherein the keycap comprises a layer of the chargeable light emissive material with a glyph portion formed in the layer of the chargeable light emissive material.

9. The keycap assembly of claim 1, wherein determining the amount of illumination energy emitted by the chargeable light emissive material comprises estimating an amount of illumination incident to the chargeable light emissive material over a duration of time based on one or more measurements of the light incident to the light sensor.

10. The keycap assembly of claim 1, wherein determining the amount of illumination energy emitted by the chargeable light emissive material comprises using a photoluminescence material absorption model.

11. A computing device, comprising:
a display;
a keyboard housing;
a set of key mechanisms disposed within the keyboard housing, the set of key mechanisms comprising photoluminescent keycaps;
a light sensor positioned external to the keyboard housing and having a field of view including a view of photoluminescent surfaces of the photoluminescent keycaps; and
a microcontroller that, in response to light sensor data from the light sensor, causes the display to provide an illumination output to the photoluminescent keycaps.

12. The computing device of claim 11, wherein ambient light or light from the set of key mechanisms is detectable by the light sensor.

13. The computing device of claim 11, wherein the illumination output of the display comprises a wavelength invisible to an unaided human eye.

14. The computing device of claim 11, wherein the light sensor is configured to generate the light sensor data indicative of a charge level for the photoluminescent keycaps.

15. The computing device of claim 14, wherein the illumination output of the display comprises:
a first illumination output associated with a first illuminance when the charge level of the photoluminescent keycaps satisfies a charge threshold; and
a second illumination output associated with a second illuminance that differs from the first illuminance when the charge level of the photoluminescent keycaps falls below the charge threshold.

16. The computing device of claim 15, wherein the microcontroller, in response to the light sensor data from the light sensor, transitions the display from providing the first illumination output to providing the second illumination output.

17. A keyboard assembly, comprising:
a keyboard housing;
a set of key mechanisms disposed within the keyboard housing;
a photoluminescent material associated with a top surface of at least one of the set of key mechanisms or the keyboard housing;
a light sensor disposed on or within the keyboard housing, wherein light detected by the light sensor is indicative of incident light onto the photoluminescent material, wherein the light sensor is positioned outside peripheries of the key mechanisms of the set of key mechanisms in a direction perpendicular to the top surface; and
a microcontroller that, in response to the light detected by the light sensor, transmits a digital communication to an electronic device.

18. The keyboard assembly of claim 17, wherein the light sensor is positioned on or within the keyboard housing at a location where the light detected by the light sensor comprises an approximately equivalent illumination intensity as the incident light onto the photoluminescent material.

19. The keyboard assembly of claim 17, wherein the digital communication comprises a current charge level of the photoluminescent material.

20. The keyboard assembly of claim 17, wherein the photoluminescent material is positioned on a key web of the keyboard housing between the set of key mechanisms.

21. The keyboard assembly of claim 17, further comprising a substrate, wherein light passes through or emits from a surface of the substrate and impinges upon the light sensor.

22. The keyboard assembly of claim 17, wherein the electronic device includes a light source and the digital communication includes a signal to adjust light output from the light source based on the light detected by the light sensor.

* * * * *